US008115910B2

(12) United States Patent
Bloss et al.

(10) Patent No.: US 8,115,910 B2
(45) Date of Patent: Feb. 14, 2012

(54) APPARATUS AND METHOD FOR THE OPTICAL EXAMINATION OF VALUE DOCUMENTS

(75) Inventors: Michael Bloss, Munich (DE); Martin Clara, Munich (DE); Wolfgang Deckenbach, Schechen (DE)

(73) Assignee: Giesecke & Devrient GmbH, Munich (DE)

( * ) Notice: Subject to any disclaimer, the term of this patent is extended or adjusted under 35 U.S.C. 154(b) by 126 days.

(21) Appl. No.: 12/443,125

(22) PCT Filed: Sep. 26, 2007

(86) PCT No.: PCT/EP2007/008383

§ 371 (c)(1),
(2), (4) Date: Mar. 26, 2009

(87) PCT Pub. No.: WO2008/037457

PCT Pub. Date: Apr. 3, 2008

(65) Prior Publication Data

US 2010/0060880 A1 Mar. 11, 2010

(30) Foreign Application Priority Data

Sep. 27, 2006 (DE) ........................ 10 2006 045 626

(51) Int. Cl.
*G06K 9/74* (2006.01)
(52) U.S. Cl. ........................................................ 356/71
(58) Field of Classification Search ..................... 356/71
See application file for complete search history.

(56) References Cited

U.S. PATENT DOCUMENTS

| | | | | |
|---|---|---|---|---|
| 5,325,386 | A | 6/1994 | Jewell et al. | |
| 6,274,879 | B1 | 8/2001 | Best-Timmann | |
| 6,456,375 | B1 | 9/2002 | Ottens et al. | |
| 6,819,812 | B2 | 11/2004 | Kochergin et al. | |
| 6,838,687 | B2 * | 1/2005 | Tullis et al. | 250/559.07 |
| 7,184,133 | B2 * | 2/2007 | Coombs et al. | 356/71 |
| 2001/0046712 | A1 | 11/2001 | Hang et al. | |
| 2002/0105654 | A1 | 8/2002 | Goltsos | |
| 2005/0217969 | A1 | 10/2005 | Coombs et al. | |
| 2006/0261351 | A1 * | 11/2006 | Nakazato et al. | 257/79 |
| 2007/0188722 | A1 | 8/2007 | Stober | |
| 2008/0135780 | A1 | 6/2008 | Giering et al. | |

FOREIGN PATENT DOCUMENTS

| | | | |
|---|---|---|---|
| CN | 1082228 | A | 2/1994 |
| CN | 1311436 | A | 9/2001 |
| DE | 103 14 101 | A | 10/2004 |
| DE | 10 2004 014541 | B3 | 5/2005 |

(Continued)

OTHER PUBLICATIONS

Search Report of German Patent Office Regarding German Patent Application No. 10 2006 045 626.2, Apr. 23, 2007.

(Continued)

*Primary Examiner* — Michael P Stafira
(74) *Attorney, Agent, or Firm* — Bacon & Thomas, PLLC

(57) ABSTRACT

An apparatus for optical analysis of at least one value document (12) in a recording area (38) of the apparatus has an illumination device (36) for illuminating the value document (12) in the recording area (38) and possessing at least one surface emitting laser diode (50), a control device (42) for driving the laser diode (50), and a detection device (40) for recording optical radiation from the recording area (38).

28 Claims, 4 Drawing Sheets

FOREIGN PATENT DOCUMENTS

| | | | |
|---|---|---|---|
| DE | 10 2004 035 494 | A1 | 2/2006 |
| EP | 1 411 379 | B1 | 4/2004 |
| WO | 2006/044758 | A2 | 4/2006 |
| WO | WO 2007/000045 | | 1/2007 |

OTHER PUBLICATIONS

Chinese Office Action issued in related application No. 200780043576.4 Sep. 29, 2011, 8 pages.

* cited by examiner

APPARATUS AND METHOD FOR THE OPTICAL EXAMINATION OF VALUE DOCUMENTS

FIELD OF THE INVENTION

The present invention relates to an apparatus and method for optical analysis of value documents.

BACKGROUND

Value documents are understood here to be card- or in particular sheet-shaped objects that represent for example a monetary value or an authorization and/or are not to be producible at will by unauthorized persons. They therefore have features that are not easy to produce, in particular to copy, whose presence is an indication of authenticity, i.e. production by an authorized body. Important examples of such value documents are chip cards, coupons, vouchers, checks and in particular bank notes.

Value documents are often analyzed optically for recognition of their type and/or their state and/or for a check of authenticity. It is fundamentally possible to use ambient light for the analysis, but such analyses show excessive errors due to fluctuations in the properties of the ambient light.

Analysis is therefore done using apparatuses that possess an illumination device for illuminating with optical radiation of given properties at least a part of a value document portion determined by a recording area of the apparatus, and a detection device for detecting optical radiation coming from the recording area, in particular a value document illuminated by the illumination device.

Although it is possible to use light sources such as halogen lamps for illumination, they consume a lot of power compared with the radiated power emitted in a desired spectral range and therefore require adequate cooling. They further have the disadvantage of not having a very long life. Furthermore, such light sources have considerable space requirements.

SUMMARY

The present invention is therefore based on the problem of providing an apparatus for optical analysis of value documents that permits good illumination of a value document to be analyzed while having a compact structure, as well as of specifying a corresponding method.

This problem is solved by an apparatus for optical analysis of at least one value document in a recording area of the apparatus, having an illumination device for illuminating the value document in at least a part of the recording area and possessing at least one surface emitting laser diode, and a control device for driving the laser diode, and a detection device for recording optical radiation from at least a part of the recording area.

The problem is further solved by a method for optical analysis of a value document in a recording area wherein the value document is illuminated with at least one surface emitting laser diode.

In the method it is possible to preferably record optical radiation from at least a part of the recording area that occurs through the illumination of the value document. This can be in particular luminescence radiation excited in the value document, optical radiation reflected by the value document or transmitted therethrough.

The detection device can accordingly be disposed relative to the illumination device and the recording area in particular in such a way that its radiation entry is located on the same side of the value document where it is illuminated, or on the opposite side. This means that the detection device can be so disposed that analysis is possible with incident or transmitted light or in reflection or transmission.

The analysis can fundamentally be done when the value document is at rest relative to the analysis apparatus and in particular to the illumination device. However, in particular upon use in a value document processing apparatus in which value documents are analyzed automatically in succession, the value document can also be moving during illumination. The subject matter of the invention is therefore also an apparatus for processing value documents, hereinafter also referred to as a value document processing apparatus, having an inventive analysis apparatus and a transport device for moving a value document through the recording area at a given transport speed. The transport speed can be given in particular in dependence on properties of the analysis apparatus or of the transport device. Upon sequential detection it is thus possible to obtain an image of the value document portion moving through the recording area.

The invention departs completely from the conventional manners of illumination. Although it is possible to use conventional edge emitting laser diodes instead of halogen lamps for illumination, they radiate optical radiation with a very inhomogeneous and not simply symmetric intensity distribution. This can impair the analysis of the value document.

According to the invention, a surface emitting laser diode is used for illumination. A surface emitting laser diode is understood in the context of the present invention more precisely to be a vertical surface emitting laser diode or in particular a semiconductor device also referred to in English as a "vertical cavity surface emitting laser" (VCSEL), whose laser resonator is aligned with its output direction, in which radiation is to be coupled out of the laser resonator, at least approximately perpendicular to the surface of the device or chip. In particular, the laser resonator of such surface emitting laser diodes can have reflection devices, for example reflecting layers or reflecting layer systems, extending at least approximately parallel to the surface.

Surprisingly, the use of such surface emitting laser diodes offers not one but several advantages for use in an apparatus for analyzing value documents, also referred to hereinafter as an analysis apparatus.

Further, they can be produced with large exit windows compared with edge emitting laser diodes, so that the radiated beam is not, or hardly, influenced by diffraction on the edges.

Furthermore, surface emitting laser diodes have a beam profile that is rotationally symmetric in good approximation, which substantially facilitates a beam shaping with simple optical elements compared to edge emitting laser diodes.

Further, in surface emitting laser diodes the emission wavelength range is determined more strongly by the laser resonator than in edge emitting laser diodes. This allows narrower emission wavelength ranges and leads to higher thermal stability of the emission wavelength range.

The full width at half maximum (FWHM) of the emission spectrum is preferably less than 1 nm.

Also, the spatial coherence of the emitted radiation is lower than in edge emitting laser diodes, so that speckle patterns can be largely or completely avoided on a value document illuminated with the laser diode.

Due to the favorable beam shape of the surface emitting laser diodes, they can be advantageously combined with each other for illumination purposes, so that besides the laser diode at least one further surface emitting laser diode is used for illumination in the method. It is therefore preferred in the analysis apparatus that the illumination device possesses at least one further surface emitting laser diode for producing a given illumination pattern in the recording area, and the control device is configured to drive the further laser diode.

In this case it is particularly preferable that the laser diodes are configured in a component or chip. Such a configuration is readily possible only with surface emitting laser diodes and has the advantage that it is easy to produce a large array of laser diodes. A further advantage is that only one component needs to be handled as the radiation source upon assembly of the analysis apparatus, which substantially simplifies production.

Particularly preferably, more than 50 laser diodes are disposed on a component.

The drive of the laser diodes by means of the control device can be effected in different ways. In the simplest variant, all laser diodes of the illumination device are driven jointly, so that the illumination pattern obtained in the recording area is determined substantially by the number and arrangement of the laser diodes.

According to another embodiment, the illumination device has at least two groups of surface emitting laser diodes which comprise the above-mentioned surface emitting laser diodes, and the laser diodes of one group are drivable independently of those of the other group. The control device is configured to drive one group of laser diodes separately from the drive of the other groups of laser diodes. In the method the value document can then be illuminated with at least two groups of surface emitting laser diodes which contain the laser diode, the laser diodes of one group being driven separately from those of the other group. Thus, drive of the groups permits in particular a temporal and spatial variation of the illumination pattern, which offers the advantage of greater variability of the illumination. A separate or independent drive or drivability is understood here to mean that the laser diodes permit such a drive. Further, the control device must be able to drive the groups independently of each other, whereby the drive of the two groups of laser diodes can of course be coupled, for example through a programming of the control device.

According to a further embodiment, in the analysis apparatus the laser diodes are drivable singly and the control device is configured to drive the laser diodes singly. If further surface emitting laser diodes are used for illuminating the value document in the method, the laser diodes can then be driven singly. In particular, the drive can be effected independently or separately in the above-mentioned sense. The possibility of singly driving laser diodes on a chip is a further advantage of surface emitting laser diodes.

The arrangement of the laser diodes and their drive permit the illumination pattern to be largely determined in its form when only a simple illumination optic is used i.e. in particular an illumination optic with optical components, such as lenses, that are rotationally symmetric at least approximately around an optical axis, optionally folded by deflecting elements, in the area of the beam path. The use of only such an illumination optic simplifies and cheapens the production of the illumination device.

An illumination device having a plurality of surface emitting laser diodes preferably configured in a chip or component can be used advantageously for producing an areal illumination pattern due to the form of the beam profile of the laser diodes. For this purpose, the analysis apparatus is preferably configured to illuminate a given area with an illumination pattern whose location-dependent intensity variation over the area illuminated by the laser diodes is smaller than 20% of the maximum intensity of the illumination pattern. In the method the laser diodes can be driven in such a way that the laser diodes illuminate a given area of the value document with an illumination pattern whose location-dependent intensity variation over the area is smaller than 20% of the maximum intensity of the illumination pattern. Such an illumination is particularly homogeneous and thus facilitates a reliable detection of features. The given area preferably has an extent greater than 0.5 $mm^2$.

This homogeneity can fundamentally be obtained by using suitable optical components or homogenization devices in the analysis apparatus. However, the surface emitting laser diodes are preferably disposed relative to each other for illuminating a given area with an illumination pattern so that the illumination pattern produced therewith has a location-dependent intensity variation over the area smaller than 20% of the maximum intensity of the illumination pattern. This makes it possible to avoid the use of special optical components and in particular that of homogenization devices, such as diffusing disks, diffractive optical elements or light guides, which reduce the intensity of the emitted optical radiation. The analysis apparatus therefore particularly preferably has no homogenization elements, such as diffusing disks, light guides or microlens arrays, for homogenization.

The center distance between next adjacent surface emitting laser diodes of the illumination device is for this purpose preferably smaller than 150 μm.

According to a first variant, the laser diodes can be disposed in the form of a matrix in the analysis apparatus. They can be disposed in particular on the grid points of a rectangular or square grid. This permits a particularly simple production of a laser diode array on a chip, in particular since in the case of a single drivability of the laser diodes the corresponding signal connections can be simply designed. Furthermore, a particularly simple drive can be effected with this arrangement.

In a second variant of the analysis apparatus, the laser diodes are disposed on the points of a hexagonal point grid. This arrangement has the advantage that a particularly dense arrangement of the laser diodes is obtained in a simple manner, thereby permitting a particularly homogeneous illumination pattern.

As stated above, the illumination pattern can be determined in the recording area or on the value document at least in its form substantially by the arrangement of the radiating laser diodes. In the analysis apparatus the control device is therefore preferably configured to drive only some of the laser diodes in each case to emit optical radiation to produce a given illumination pattern. Accordingly, in the method the laser diodes are preferably driven to emit optical radiation so that a given illumination pattern is produced. This embodiment has the advantage that, depending on the configuration, a change of the illumination pattern requires only a change of the control device. If the latter is programmable, as is preferred, it is even only necessary to change the program.

Higher flexibility is obtained when, in a preferred embodiment of the analysis apparatus, the control device is configured to drive the laser diodes in dependence on a signal or data stored in the control device in such a way that the same illumination pattern is producible at different given locations in the recording area in dependence on the signal or data. In the method the laser diodes can then be driven in such a way in dependence on a signal or data that the same illumination pattern is producible at one of at least two different locations in dependence on the signal or data. The signal can be for example read in from an external data entry terminal via an interface or transmitted by a device of the value document processing apparatus containing the analysis apparatus. The drive of the laser diodes can consist in particular in only some of the laser diodes being switched on or off.

Thus, in a preferred embodiment of the analysis apparatus, the control device can in particular drive the surface emitting laser diodes in such a way that an extension of a detection area of the detection device in the transport direction is smaller than the extension of the illumination pattern in the transport direction, and the illumination pattern extends further with respect to the detection area regarded in the trans-port direction than contrary to the transport direction. The detection area is understood here to be that portion of the recording area from which the detection device can receive optical radiation for detection, in particular except for scattered radiation alone. A signal or data on the transport direction can be made available to the control device in the above-mentioned ways, which effects the drive of the laser diodes in dependence on the signal or data. This permits two things to be obtained at the same time. Firstly, the greater extension of the illumination pattern in the transport direction permits a greater amount of optical radiation, i.e. more energy, to be radiated onto a given area of the value document, for example a track with feature substances, upon an analysis, in particular a luminescence analysis, so that the strength of the detection radiation can be increased. Secondly, the adjustment of the analysis apparatus, more precisely, of the position of the illumination pattern relative to the detection area, can be adjusted automatically in dependence on the transport device upon installation in the value document processing apparatus by corresponding signals being transmitted to the control device for example from a drive system of the transport device or another device of the value document processing apparatus or being entered manually via an interface. The analysis apparatus can therefore be designed and used as a simply configurable module.

In the embodiment just described, the drive can in particular be switchable between two or more illumination pattern positions.

Alternatively or in combination, in the analysis apparatus the control device can be configured to drive the laser diodes in such a way that an illumination pattern changing in time during illumination is produced in the recording area. In the method it is then preferred that the laser diodes are driven in such a way that an illumination pattern changing in time during illumination is produced. The temporal change can be in particular given, for example by a corresponding configuration and/or programming of the control device.

The illumination pattern can be changed here in any desired way; in particular the form of the illumination pattern can be changed. However, it is preferred for many applications that the laser diodes are driven in such a way that a given illumination pattern is moved in a given direction at a given speed. In the analysis apparatus the control device is then configured to drive the laser diodes in such a way that a given illumination pattern is moved in a given direction at a given speed. The motion needs only to be effected for a given period of time, for example until the recording area has been swept once by the illumination pattern. Further, it is assumed that the laser diodes are disposed suitably for producing the illumination pattern. This embodiment has a number of advantages since it is usable for different purposes.

This embodiment makes it possible in particular to record a one- or two-dimensional image sequentially. In particular, in this case in the analysis apparatus the detection device only needs to be configured to detect optical radiation from the recording area integrally or only one-dimensionally in a direction perpendicular to the moving direction of the illumination pattern. Integral detection is understood here to be a detection that is non-locally resolving at a given moment. Consecutive illumination of different locations during motion of the illumination pattern and corresponding sequential detection thus make it possible to produce an image by assembling the data or signals recorded at each single detection into the image.

To permit a complete illumination that is as simple as possible to produce, the analysis apparatus can be configured in particular to produce a rectangular, in particular linear, illumination pattern.

The analysis apparatus can be used in particular for recording one- or two-dimensional bar codes through motion of the illumination pattern.

The value document can fundamentally be at rest during recording. However, for faster analysis of a large number of value documents with only one analysis apparatus, it is preferred in the method that the value document is moved in a given transport direction and at a given transport speed during illumination.

The motion speed of the illumination pattern can fundamentally be different from the transport speed.

However, in the method the value document is preferably moved in a trans-port direction at a transport speed, the direction being the transport direction and the speed being the transport speed. In a particularly preferred embodiment of the processing apparatus for processing value documents, the transport device is then configured to move a value document through the recording area at a given transport speed, and the control device is configured to drive the laser diode in such a way that the illumination pattern is moved in the transport direction at the transport speed. This embodiment makes it possible in a particularly advantageous manner for an area of the analyzed value document, in particular an optical security feature, to be followed during detection, so that analysis is possible even at very high transport speeds.

In general, but in particular also in connection with the last described embodiment, it is possible in the analysis apparatus that the control device is configured to produce an illumination pattern in a given part of the recording area in dependence on position signals from a position detection device. In the method it is accordingly preferred that the laser diodes are driven in such a way that an illumination pattern is produced in a given part of the recording area in dependence on position signals from a position detection device. This embodiment has the advantage that a device for determining the position of a value document or the position of a feature to be analyzed optically can be used to produce the position signal representing the position, in particular relative to the analysis apparatus, and that precisely this feature can be illuminated and analyzed in dependence on said position signal. This permits the amount of data arising upon an analysis of the total value document to be strongly reduced, so that an analysis can be effected faster and an evaluation device for evaluating the detection results can be constructed more simply. In particular in the case that the detection device is configured for locally resolved recording of optical radiation in at least one given spectral range, a considerable data reduction and an increase in data processing speed can be obtained when following the feature.

Alternatively to, or in combination with, the previously described embodiments, in the analysis apparatus the detection device can be configured for locally resolved recording of optical radiation in at least one given spectral range, and the control device configured to drive the laser diodes in such a way that a variation of a sensitivity of the detection device to the optical radiation in the spectral range is at least partly compensated in dependence on the location. In the method it is accordingly preferred that the laser diodes are driven in such a way that a variation of a sensitivity of a detection device for locally resolved recording of optical radiation in at least one given spectral range is at least partly compensated in dependence on the location. In this way a local adaptation of the illuminance to the sensitivity of the detection device can be effected, even after a relatively long time, thereby permitting an exact optical analysis lastingly.

Within the scope of the invention the laser diodes can be operated as continuously luminous or pulsed radiation sources, for which the control device is then configured accordingly.

BRIEF DESCRIPTION OF THE DRAWINGS

The invention will hereinafter be explained more closely by way of example with reference to the drawings. These show.

DETAILED DESCRIPTION OF VARIOUS EMBODIMENTS

Figure 1:
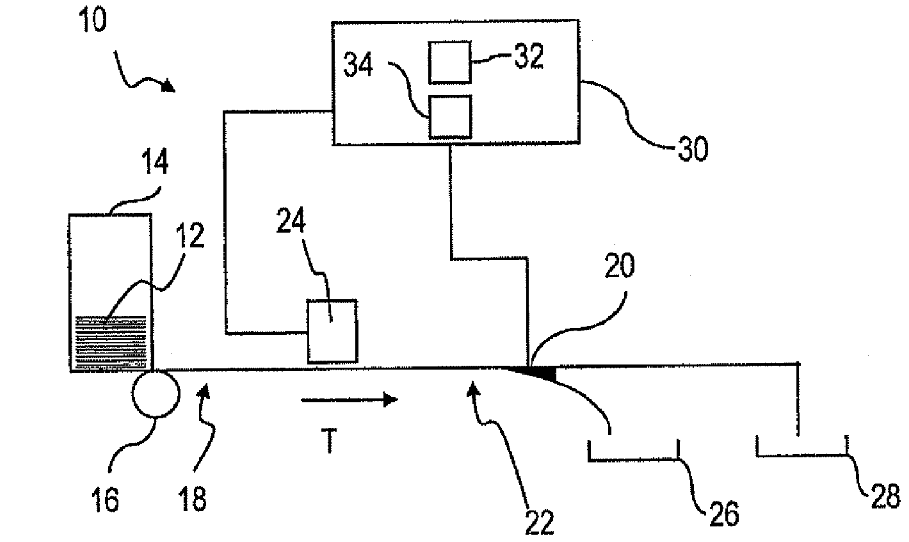
FIG. 1 a schematic representation of a value document processing apparatus according to a first preferred embodiment.

A value document processing apparatus 10 in FIG. 1 which comprises an apparatus for optical analysis of value documents 12, in the example bank notes, has an input pocket 14 for the input of value documents 12 to be processed, a singler 16 which can access value documents 12 in the input pocket 14, a transport device 18 with a gate 20, and, along a transport path 22 given by the transport device 18, an apparatus 24 for analyzing value documents which is disposed before the gate 20, and after the gate 20 a first output pocket 26 for value documents recognized as authentic and a second output pocket 28 for value documents recognized as non-authentic. A central control and evaluation device 30 is connected at least to the analysis apparatus 24 and the gate 20 via signal connections and is used for driving the analysis apparatus 24, evaluating check signals from the analysis apparatus 24 and for driving at least the gate 20 in dependence on the result of evaluation of the check signals.

The analysis apparatus 24 in connection with the control and evaluation device 30 is used for recording optical properties of the value documents 12 and forming check signals representing said properties.

While a value document 12 is transported past at a given transport speed in a transport direction T given by the transport path 22, the analysis apparatus 24 records optical property values of the value document, whereby the corresponding check signals are formed.

From the check signals of the analysis apparatus 24 the central control and evaluation device 30 determines upon a check signal evaluation whether the value document is recognized as authentic or not according to a given authenticity criterion for the check signals.

The central control and evaluation device 30 has for this purpose in particular, besides corresponding interfaces for the sensors, a processor 32 and a memory 34 connected to the processor 32 and storing at least one computer program with program code upon the execution of which the processor 32 controls the apparatus or evaluates the check signals and drives the transport device 18 in accordance with the evaluation.

In particular, the central control and evaluation device 30, more precisely the processor 32 therein, can check an authenticity criterion which includes for example reference data for a value document to be considered authentic which are given and stored in the memory 34. In dependence on the determined authenticity or non-authenticity, the central control and evaluation device 30, in particular the processor 32 therein, drives the transport device 18, more precisely the gate 20, in such a way that the value document 12 is transported, according to its determined authenticity, for storage into the first output pocket 26 for value documents recognized as authentic or into the second storage pocket 28 for value documents recognized as non-authentic.

Figure 2:
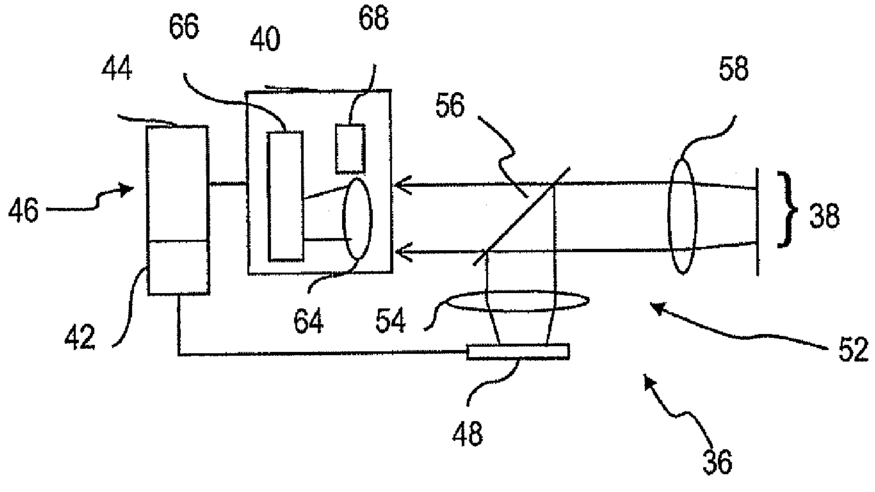
FIG. 2 a schematic representation of an analysis apparatus of the value document processing apparatus in FIG. 1, FIG. 3 a schematic plan view of an edge emitting laser diode, FIG. 4 a schematic representation of a beam profile of the edge emitting laser diode in FIG. 3 in the form of a contour diagram, FIG. 5 a schematic lateral sectional view of a surface emitting laser diode, FIG. 6 a schematic representation of a beam profile of the surface emitting laser diode in FIG. 5 in the form of a contour diagram, FIG. 7 a schematic plan view of a chip of the analysis apparatus in FIG. 2 with a matrix arrangement of surface emitting laser diodes, FIG. 8 a lateral view and a plan view for two possible illuminations by drives of the laser diodes in FIG. 7, FIG. 9 a schematic representation of a value document processing apparatus according to a second preferred embodiment FIG. 10 a schematic representation of a temporal evolution of an illumination of a value document transported in the value document processing apparatus in FIG. 9, wherein the illumination pattern is guided after the value document, in a lateral view and a plan view, FIG. 11 a schematic representation of a temporal evolution of an illumination of a value document at rest wherein the illumination pattern is guided over the value document, in a lateral view and a plan view, FIG. 12 a schematic representation of a part of a detection device of an analysis apparatus according to a further embodiment of the invention, and FIG. 13 a schematic plan view of a chip of the analysis apparatus in FIG. 2 with an arrangement of surface emitting laser diodes on grid points of a hexagonal point grid.

The analysis apparatus 24 is shown more exactly in FIG. 2. It comprises an illumination device 36 for illuminating at least a part of a flat recording area 38 in the transport path 22 which is reached via the transport path 22 by value documents 12 to be analyzed, and a detection device 40. A control device 42 for driving the illumination device 36, and an evaluation device 44 for evaluating signals from the detection device 40 are combined in a programmed data processing device 46 which in this example comprises a processor (not shown) and a memory (not shown) which stores a program, executable by the processor, for controlling the illumination device 36 and for evaluating the signals from the detection device 40. The control and evaluation devices 42, 44 are connected to the central control and evaluation device 30 via a signal connection.

The illumination device 36 has a semiconductor device or a semiconductor chip 48 in which a matrix arrangement of at least fifty surface emitting laser diodes 50 for emitting optical radiation in a given spectral range is configured (cf. FIG. 7), and an illumination optic 52. The latter possesses, along an illuminating beam path, a beam-concentrating optic 54, a deflecting element 56 for deflecting the optical radiation leaving the beam-concentrating optic into the recording area 38, and a focusing optic 58 for focusing the deflected illumination radiation as an illumination pattern 60 onto an illumination field 62 in the recording area 38.

The spectral range is given by the type of value documents to be analyzed, more precisely of security features formed thereon. In this example, luminescence properties of the value documents are to be analyzed. For this purpose the spectral range is selected so that the excitation radiation for luminescence of an authentic value document is within the spectral range. The deflecting element 56 is deflective for the excitation radiation, but in good approximation transparent to the luminescence radiation, so that the latter can pass through the deflecting element 56 without deflection.

Optical radiation emanating from the recording area 38 or from a value document 12 therein, i.e. detection radiation, is imaged into infinity by the focusing optic 58 and passes through the deflecting element 56 without deflection into the detection device 40, which in the example comprises a detection optic 64, a spectrographic device 66, for example an imaging optical grating, illuminated by means of the detection optic 64, and detection elements 68 for recording the intensity of spatially separated spectral components of the detection radiation which are produced by the spectrographic device 66. For transmission of detection signals representing the intensity of the impinging spectral components to the evaluation device 44 the detection elements 68 are connected thereto via signal connections. The detection device 40 therefore records the detection radiation in locally unresolved fashion, so that an integral recording of the detection radiation is given.

Figure 7:
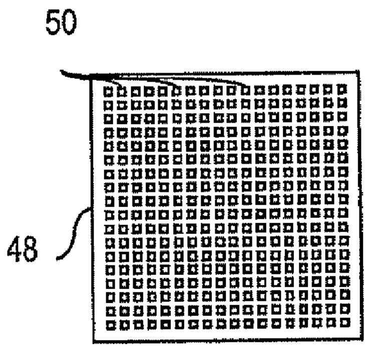

As illustrated in FIG. 7, the surface emitting laser diodes 50 are disposed in the semiconductor device 48 of the illumination device 36 in parallel rows and columns perpendicular to the rows, whereby the distance between next adjacent laser diodes is 110 μm immediately before the particular laser diode.

Figure 3:
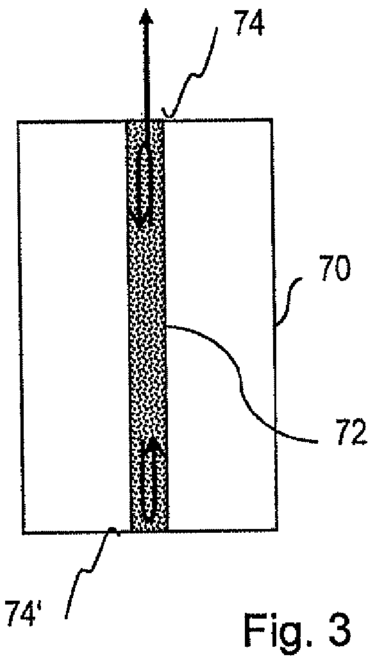
Figure 4:
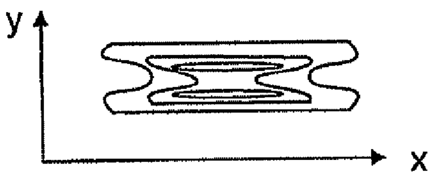

To distinguish clearly from conventional edge emitting laser diodes, FIG. 3 shows a schematic plan view of a semiconductor device 70 with an edge emitting laser diode. The semiconductor device 70 has configured therein, parallel to the surface of the semiconductor device 70 or of the wafer for producing the semiconductor device, a resonator 72 which on its edges 74 and 74' along a low indexed lattice plane is partly reflective to the laser radiation to be produced and in which the laser active zone, i.e. a p-n junction, of the laser diode is located. The output laser radiation is emitted, as indicated in FIG. 3, perpendicular to the edges 74 and 74' and parallel to the surface. The beam profile, i.e. the intensity distribution over a plane perpendicular to the beam direction, is shown in FIG. 4 schematically as a contour diagram in which x and y are Cartesian coordinates in the plane and the lines represent lines of equal intensity. One can clearly recognize a saddle shape of the distribution, which is therefore not rotationally symmetric.

Figure 5:
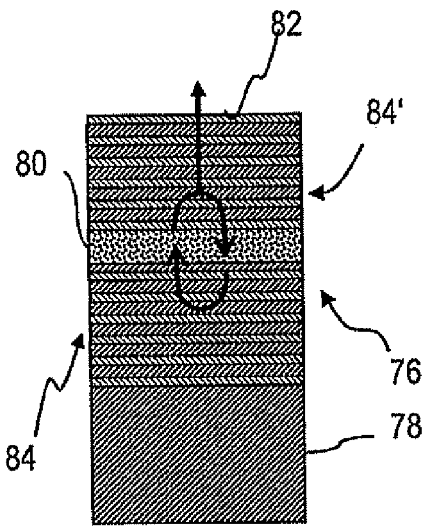

FIG. 5 shows schematically, in contrast, a surface emitting laser diode 76 wherein a substrate 78 has disposed thereon a resonator 80 which is given by reflection structures or reflecting layer structures 84, 84', for example in the form of interference layers, extending parallel to the substrate 78 and the wafer surface 82. The laser radiation is now emitted perpendicular to the surface 82 of the wafer or the substrate 78. For simplicity's sake the electrodes and the distribution of the current-carrying layers are not explicitly shown.

Figure 6:
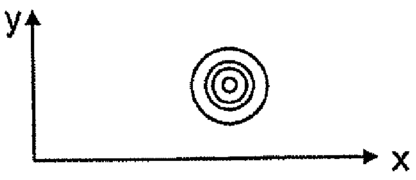

FIG. 6 shows, in a representation corresponding to FIG. 4, the beam profile of the laser beam emitted by the surface emitting laser diode. It is in good approximation rotationally symmetric around the beam direction and is therefore very well suited for further beam shaping with a simple illumination optic with spherical and planar optical elements as in this embodiment.

The surface emitting laser diodes 50 are configured and contacted in the semiconductor device 48 so as to be singly drivable independently of each other.

Number, arrangement and area of the surface emitting semiconductor diodes 50 and the illumination optic 52 are selected so that a contiguous areal illumination field with a superficial extent of at least 0.5 $mm^2$ can be illuminated in the recording area 38 homogeneously, i.e. with an intensity fluctuation based on the maximum intensity in the illumination area smaller than 20%.

The control device 42 is used for separately driving the laser diodes 50. In this embodiment the analysis apparatus 24 is designed as a module to be installed in a value document processing apparatus, said module being so constructed that the value documents 12 are fundamentally feedable thereto from opposite directions.

To obtain as long an illumination as possible of luminescent substances in a value document to be analyzed, the control device 42 drives the laser diodes 50 in such a way that an illumination field 62 or an illumination pattern 60 extending further beyond a detection field 86 (cf. FIG. 8) contrary to the transport direction T than in the transport direction T is produced in the recording area 38. The detection field 86 is defined in that, except for scattered radiation, only optical radiation from the detection field 86 can reach the detection device 40. This achieves that an area on the value document is exposed to the illumination or excitation radiation for a time that is longer than the time in which it is located in the detection field 86. This permits an increased luminescence radiation to be obtained, which facilitates the detection of the luminescence.

Figure 8:
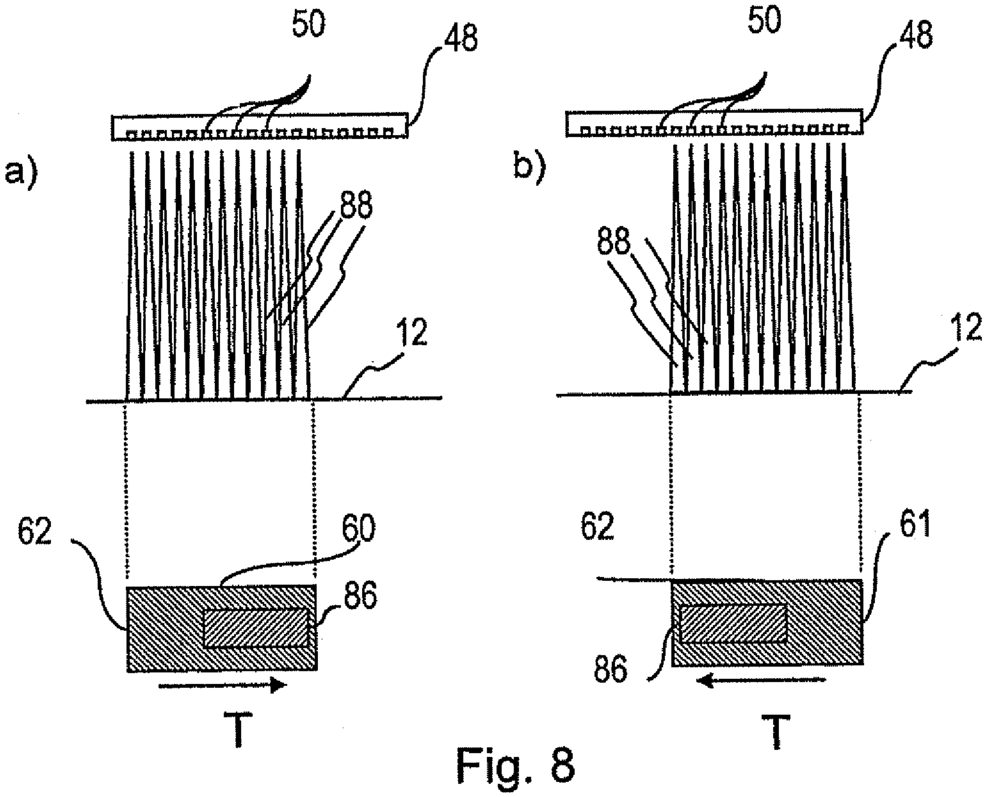

The control device 42 is so adapted, here through corresponding programming, that upon a signal from the central control and evaluation device 30 which represents the transport direction T with respect to the position of the analysis apparatus 24, it drives the laser diodes 50 in such a way that one of the two illumination patterns 60, 61 shown in FIG. 8 is produced by the laser beams 88 in the recording area 38 in dependence on the transport direction T or the signal representing it. They are shifted relative to the chip 48 so that the above-described effect occurs. For this purpose, only some of the laser diodes 50 are switched on, namely the laser diodes on the left (a)) or right (b)) in FIG. 8, while the others remain switched off. The figure does not show the illumination optic 52 or its influence on the beam path for simplicity's sake. "Switched on" is understood here to mean that they are operated either continuously or also in pulsed fashion.

Figure 9:
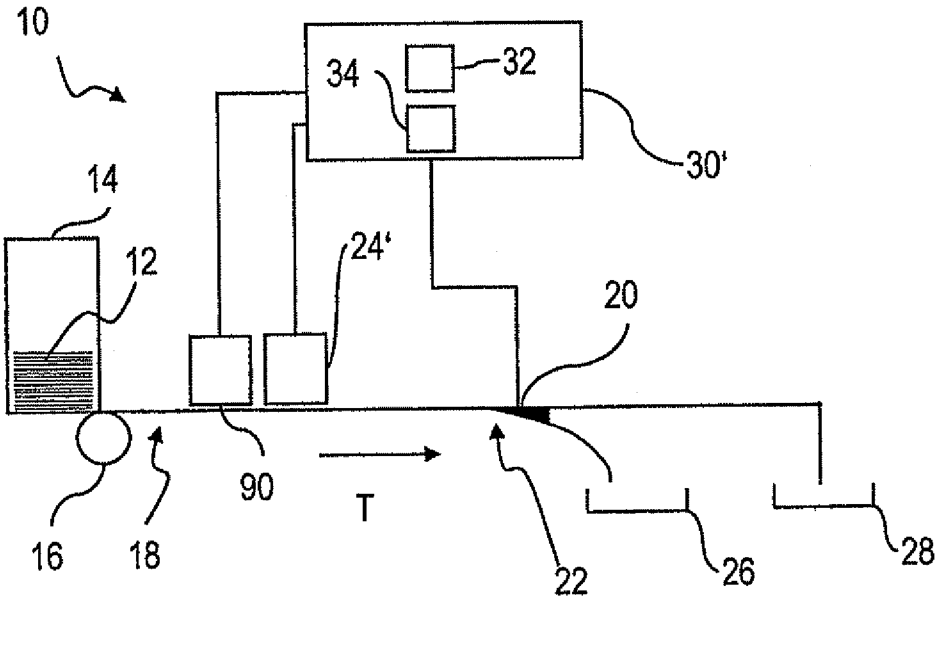

A second embodiment in FIG. 9 differs from the first embodiment in that there is now disposed along the transport path 22 upstream of an analysis apparatus 24' an image sensor 90 which is used for recording images of fed value documents and transfers the images to a central control and evaluation device 30' via an image signal connection. All other components are unchanged, so that the same reference signs are used for them as in the first embodiment and the comments on the first embodiment also apply accordingly here.

The central control and evaluation device 30' differs from the central control and evaluation device 30 in that it has an interface (not shown in FIG. 9) for recording the image data of the image sensor 90 and is configured, in the example through a corresponding program module, to determine from the image data the position of an area of the value document, for example of a certain feature area, to be analyzed more exactly with the optical analysis apparatus 24' and to output it to the analysis apparatus 24'. The image sensor 90 therefore constitutes, in conjunction with the central control and evaluation device 30', a position detection device.

Figure 10:
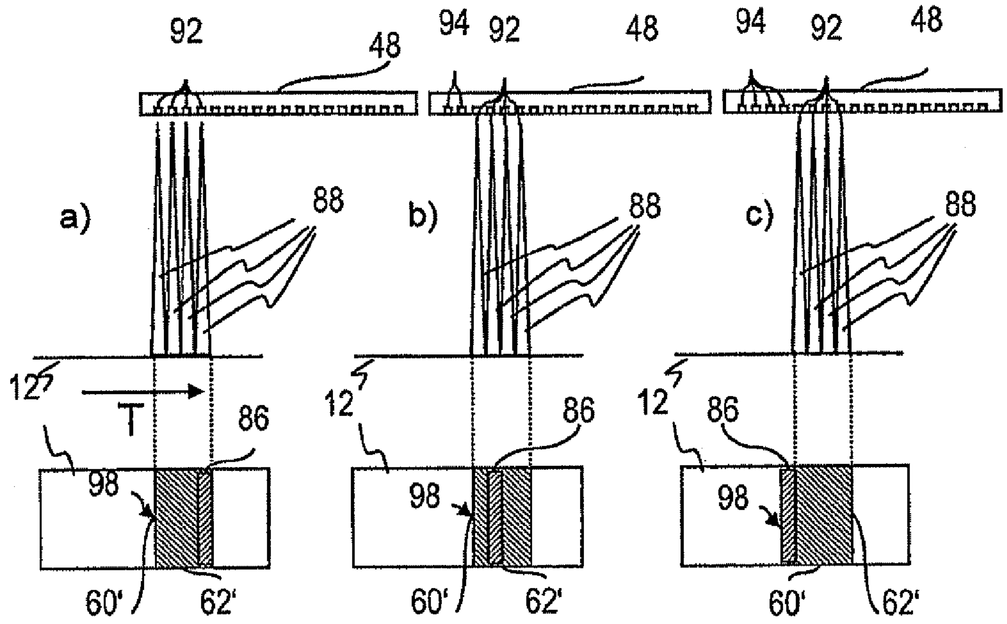

The analysis apparatus 24' differs from the analysis apparatus 24 of the first embodiment solely in that the control device is now changed compared to the control device 42. The control device is, more precisely, configured to drive the laser diodes 50 differently from the control device 42. As shown schematically in FIG. 10 in a time sequence a), b), c) in a manner corresponding to FIG. 8, the control device drives the laser diodes 50 in such a way that laser diodes 92 at the front in the transport direction are switched on and laser diodes 94 at the back in the transport direction are switched off progressing in the transport direction T in each case in time sequence. This is effected in such a way that the same illumination pattern 60' or illumination field 62' which is produced from laser beams 88 of the front laser diodes is carried along directed onto the selected area 98 in the transport direction T at the transport speed T. Thus, in effect only the selected area 98 is illuminated while it is transported through the detection field 86. This makes it possible to effectively reduce the production of scattered radiation or interfering radiation from other areas of the value document 12.

In other embodiments the image sensor 90 can also be replaced by other devices, compared to the last embodiment, that permit recognition of the position of certain features to be analyzed. For example, it is also possible, depending on the feature, to use a signal from an edge detector for recognizing an edge of the value document leading in the transport direction, for example a light barrier or an ultrasonic sensor, in connection with the known transport speed and the known position of the feature on the value document to produce a suitable position signal.

A further embodiment differs from the first embodiment in that for analysis of a value document the value document is stopped completely and after it is stopped in the recording area a start signal is outputted to an analysis apparatus 24", for which purpose the central control and evaluation device 30 is modified accordingly. The analysis apparatus 24" differs from the analysis apparatus 24 of the first embodiment solely by the configuration or programming of the control and the evaluation devices 42, 44. For all other components the same reference signs are therefore used as in the first embodiment and the comments thereon also apply accordingly here.

Figure 11:
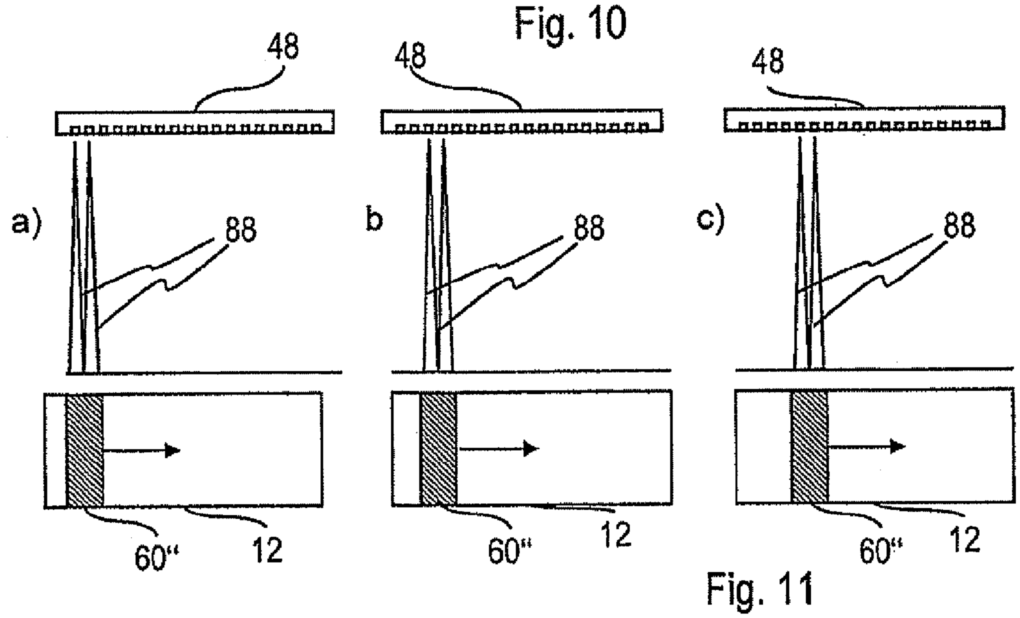

The control device is configured to drive the laser diodes 50 in such a way that they produce an illumination pattern changing in time during illumination. More precisely, the laser diodes are driven in such a way that the same illumination pattern 60" is moved over the value document 12 at a speed that is constant in the example, as illustrated in FIG. 11 corresponding in representation to FIG. 10 in a time sequence a), b), c). At the same time the reflected detection radiation is recorded at constant time intervals, in case of pulsed drive of the laser diodes in synchronism with the pulses, by the detection device 40 and the evaluation device 44 and stored in the evaluation device 44 according to the time sequence and thus the location on the value document, or transferred directly to the central control and evaluation device. Thus, an image of the value document is obtained. Optionally after intermediate storage in the evaluation device, the corresponding image data are transmitted to the central control and evaluation device 30 and evaluated further there.

The illumination pattern 60" has a rectangular slot shape, as illustrated in FIG. 11. The illumination pattern 60" is preferably so narrow that it can serve as a “virtual” entrance slit for the detection device or the spectrographic device, which then need no longer have an entrance slit.

Such an analysis apparatus can also be used advantageously for recognizing bar codes. In particular in this case the detection device need then only have a detection element but not a spectrographic device.

In another variant, it is possible to provide in the detection device, instead of only one detection element, a row of detection elements by means of which areas in the recording or detection area are recordable in locally resolved fashion along a row perpendicular to the moving direction of the illumination pattern. Such an analysis apparatus can in particular also be used for recording two-dimensional bar codes.

In a further embodiment, the analysis apparatus differs from the analysis apparatus of the first embodiment by a different detection device 40''' as well as a different control and evaluation device.

Figure 12:
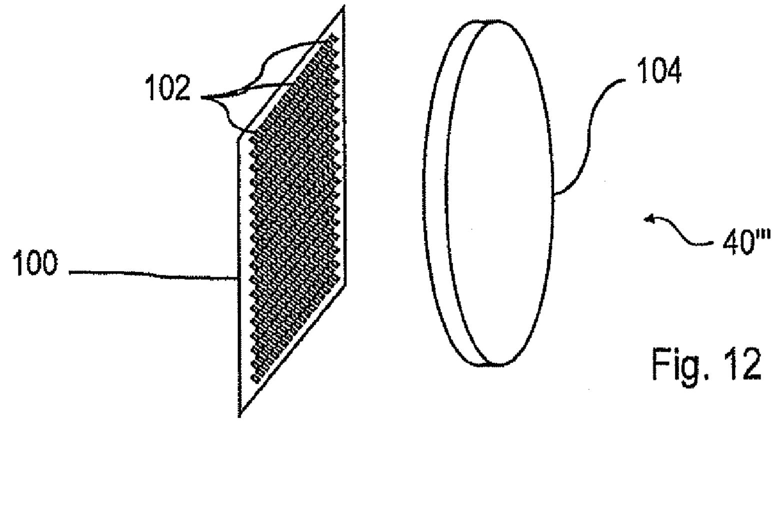

The detection device 40''' (cf. FIG. 12) has a field 100 with a two-dimensional arrangement of detection elements 102 for locally resolved detection of optical radiation coming from the recording area 38 or the detection field 86, as well as an imaging optic 104 for focusing the infinite beam path after the focusing optic 58 onto the arrangement of detection elements 102. The detection elements 102 can have different sensitivities to optical radiation in the same spectral range, for example due to fluctuations during production or to different aging.

The control device 42" is changed, i.e. configured, as opposed to the control device 42 in such a way as to drive the laser diodes 50 according to the sensitivity of the detection elements 102 in such a way that the differences in sensitivity are evened out. More precisely, this means that the laser diodes 50 are driven in such a way that all detection elements 102 output the same detection signals.

Errors in the imaging optic can also be compensated in this way.

The evaluation device 44" is configured to record the detection signals of the detection elements 102.

In a particularly preferred embodiment, the control device is configured to record the detection signals from the detection elements for a given drive of the laser diodes by means of the evaluation device, and to automatically change the drive of the laser diodes in such a way that all detection elements emit the same detection signal.

This corresponds in a sense to a calibration of the analysis apparatus. This process can, depending on the embodiment, be carried out automatically at given intervals in the service life of the analysis apparatus or upon each switch-on or switch-off of the analysis apparatus, for which purpose the control device can be configured accordingly, for example through corresponding programming.

Yet a further embodiment differs from the first embodiment only in that the surface emitting laser diodes 50 are configured in the semiconductor device and contacted so as to be drivable separately or independently of each other in at least two groups, in this embodiment row by row. The control device 42 is accordingly modified in such a way as to drive the groups, i.e. here the rows, singly separately from each other, whereby the same illumination pattern as in the first embodiment can be obtained.

Figure 13:
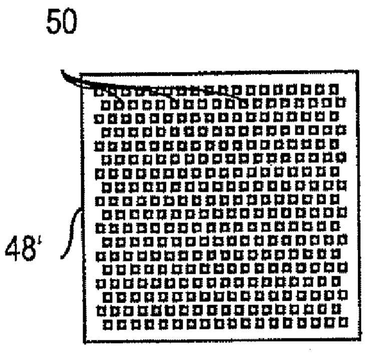

Further embodiments differ from the previously described embodiments only by the arrangement of the laser diodes 50 in the semiconductor device 48'. All other parts are unchanged. The surface emitting laser diodes 50 are now disposed in the semiconductor device 48' (cf. FIG. 13) on the grid points of a hexagonal point grid at a distance of nearest neighbors smaller than 120 μm, in the example 100 μm, thereby making it possible to obtain a further increase in the homogeneity of the illumination pattern.

In yet further embodiments, the illumination device does not have the deflecting element 56, so that a straight illuminating beam path is obtained. The detection device is configured and disposed for detecting optical radiation after transmission through the value document. It has its own optic, corresponding in its properties to the focusing optic, for imaging at least a portion of the value document on the side not illuminated by the illumination device.

In other embodiments, the illumination of the value document can also be effected at angles other than 90°, in which case the detection device might be configured and disposed accordingly.

The invention claimed is:

1. An apparatus for optical analysis of at least one value document in a recording area of the apparatus, comprising:

an illumination device arranged to illuminate a value document in at least a part of the recording area and comprising at least four surface emitting laser diodes, a control device adapted to drive the laser diodes, and a detection device arranged to record optical radiation from at least a part of the recording area, wherein the laser diodes are configured in a chip, wherein said surface emitting laser diodes comprise at least two groups of surface emitting laser diodes, each group having at least two surface emitting laser diodes, wherein the laser diodes of one group are drivable independently of those of the other group, and wherein the control device is configured to drive one group of laser diodes separately from the drive of the other group or groups of laser diodes.

2. The apparatus according to claim 1, wherein the illumination device comprises at least two surface emitting laser diodes arranged to produce a given illumination pattern in the recording area.

3. The apparatus according to claim 2, wherein the laser diodes are configured in a component.

4. The apparatus according to claim 2, wherein the laser diodes are drivable singly and the control device is configured to drive the laser diodes singly.

5. An apparatus for optical analysis of at least one value document in a re-cording area of the apparatus, comprising:

an illumination device arranged to illuminate a value document in at least a part of the recording area and comprising at least one surface emitting laser diode, a control device adapted to drive the at least one laser diode, and a detection device arranged to record optical radiation from at least a part of the recording area, wherein the illumination device is configured to illuminate a given area with an illumination pattern whose location-dependent intensity variation over the area illuminated by the at least one laser diode is smaller than 20% of the maximum intensity of the illumination pattern.

6. The apparatus according to claim 5, wherein the given area has an extent greater than 0.5 $mm^2$.

7. An apparatus for optical analysis of at least one value document in a re-cording area of the apparatus, comprising:

an illumination device arranged to illuminate a value document in at least a part of the recording area and comprising at least one surface emitting laser diode, a control device adapted to drive the at least one laser diode, and a detection device arranged to record optical radiation from at least a part of the recording area, wherein the at least one laser diode is disposed in the form of a matrix or on the points of a hexagonal point grid.

8. The apparatus according to claim 2, wherein the control device is configured to selectively drive only some of the laser diodes to emit optical radiation to produce a given illumination pattern.

9. The apparatus according to claim 8, wherein the control device is configured to drive the laser diodes in dependence on a signal or data stored in the control device in such a way that the same illumination pattern is producible at different given locations in the recording area in dependence on the signal or data.

10. The apparatus according to claim 8, wherein the control device is configured to drive the laser diodes in such a way that an illumination pattern changing in time during illumination is produced in the recording area.

11. An apparatus for optical analysis of at least one value document in a re-cording area of the apparatus, comprising:

an illumination device arranged to illuminate a value document in at least a part of the recording area and comprising at least two surface emitting laser diodes, a control device adapted to drive the laser diodes, and a detection device arranged to record optical radiation from at least a part of the recording area, wherein the control device is configured to selectively drive only some of the laser diodes to emit optical radiation to produce a given illumination pattern, and to drive the laser diodes in such a way that a given illumination pattern is moved in a given direction at a given speed.

12. An apparatus for optical analysis of at least one value document in a re-cording area of the apparatus, comprising an illumination device arranged to illuminate a value document in at least a part of the recording area and comprising at least two surface emitting laser diodes, a control device adapted to drive the laser diode, and a detection device arranged to record optical radiation from at least a part of the recording area, wherein the control device is configured to selectively drive only some of the laser diodes to emit optical radiation to produce a given illumination pattern and the illumination device is configured to produce a rectangular illumination pattern.

13. The apparatus according to claim 1, wherein the detection device integrally detects optical radiation coming from the recording area.

14. The apparatus according to claim 2, wherein the detection device is configured for locally resolved recording of optical radiation in at least one given spectral range, and wherein the control device is configured to drive the laser diodes in such a way that a variation of a sensitivity of the detection device to the optical radiation in the spectral range is compensated at least partly in dependence on the location.

15. The apparatus according to claim 2, wherein the control device is configured to produce an illumination pattern in a given part of the recording area in dependence on position signals from a position detection device.

16. An apparatus for processing value documents having an analysis apparatus according to claim 1 and a transport device for moving a value document through the recording area at a given speed.

17. An apparatus for processing value documents having an analysis apparatus comprising an illumination device arranged to illuminate a value document in at least a part of the recording area and comprising at least one surface emitting laser diode, a control device adapted to drive the at least one laser diode, and a detection device arranged to record optical radiation from at least a part of the recording area, wherein the at least one laser diode is configured in a chip, and a transport device arranged to move a value document through the recording area at a given speed, and wherein the control device is configured to drive the at least one laser diode in such a way that the illumination pattern is moved in the transport direction at the transport speed.

18. A method for optical analysis of a value document, comprising illuminating the value document in a recording area with at least four surface emitting laser diodes, the at least four laser diodes configured in a chip, wherein the illumination is carried out using a plurality of surface emitting laser emitting diodes, said plurality of diodes comprising at least two groups of surface emitting laser diodes with the laser diodes of one group being driven separately from those of the other group, wherein each group having at least two surface emitting laser diodes.

19. The method according to claim 18, wherein the laser diodes are driven singly.

20. A method for optical analysis of a value document, comprising illuminating the value document in a recording area with a plurality of surface emitting laser diodes, the laser diodes being configured in a chip, said plurality of diodes comprising at least two groups of surface emitting laser diodes with the laser diodes of one group being driven separately from those of the other group, wherein the laser diodes are driven in such a way that the laser diodes illuminate a given area of the value document with an illumination pattern whose location-dependent intensity variation over the area is smaller than 20% of the maximum intensity of the illumination pattern.

21. The method according to claim 18, wherein the laser diodes are driven to emit optical radiation, so that a given illumination pattern is produced.

22. The method according to claim 18, wherein the laser diodes are driven in such a way in dependence on a signal or data that the same illumination pattern is producible at one of at least two different locations in dependence on the signal or data.

23. The method according to claim 18, wherein the laser diodes are driven in such a way that an illumination pattern changing in time during illumination is produced.

24. A method for optical analysis of a value document, comprising illuminating the value document in a recording area with a plurality of surface emitting laser diodes, the laser diodes being configured in a chip, said plurality of diodes comprising at least two groups of surface emitting laser diodes with the laser diodes of one group being driven separately from those of the other group, wherein the laser diodes are driven in such a way that a given illumination pattern is moved in a given direction at a given speed.

25. The method according to claim 24, wherein the value document is moved in a given transport direction and at a given transport speed during illumination.

26. The method according to claim 25, wherein the value document is moved in a transport direction at a transport speed and wherein the direction is the transport direction and the speed is the transport speed.

27. The method according to claim 18, wherein the laser diodes are driven in such a way that a variation of a sensitivity of a detection device for locally resolved recording of optical radiation in at least one given spectral range is compensated at least partly in dependence on the location.

28. The method according to claim 18, wherein the laser diodes are driven in such a way that an illumination pattern is produced in a given part of the recording area in dependence on position signals from a position detection device.

* * * * *